United States Patent [19]

Wong

[11] Patent Number: 4,505,602

[45] Date of Patent: Mar. 19, 1985

[54] METHOD FOR ENCODING IDEOGRAPHIC CHARACTERS

[76] Inventor: Wyman S. Wong, 1914 Glendora Dr., District Heights, Md. 20747

[21] Appl. No.: 649,143

[22] Filed: Sep. 7, 1984

Related U.S. Application Data

[63] Continuation-in-part of Ser. No. 428,692, Sep. 30, 1982, abandoned.

[51] Int. Cl.³ .............................................. B41J 5/00
[52] U.S. Cl. ..................................... 400/110; 364/418
[58] Field of Search ................ 400/110, 484; 340/711, 340/751; 364/419, 518

[56] References Cited

U.S. PATENT DOCUMENTS

| | | | |
|---|---|---|---|
| 1,245,633 | 11/1917 | Sugimoto | 400/110 |
| 2,534,330 | 12/1950 | Wong | 400/110 |
| 2,613,794 | 10/1952 | Yutang | 400/110 |
| 2,613,795 | 10/1952 | Yutang | 400/110 |
| 2,950,800 | 8/1960 | Caldwell | 400/110 |
| 3,319,516 | 5/1967 | Brown | 400/110 X |
| 3,325,786 | 6/1967 | Shashoua et al. | 400/110 X |
| 3,820,644 | 6/1974 | Yeh | 400/110 X |
| 4,064,983 | 12/1977 | Inose et al. | 400/110 |
| 4,096,934 | 6/1978 | Kirmser et al. | 400/110 |
| 4,144,405 | 3/1979 | Wakamatsu | 400/110 X |
| 4,187,031 | 2/1980 | Yeh | 400/110 X |
| 4,228,507 | 10/1980 | Leban | 400/110 X |
| 4,379,288 | 4/1983 | Leung et al. | 400/484 |

Primary Examiner—Clifford D. Crowder
Assistant Examiner—David A. Wiecking

[57] ABSTRACT

This method is for encoding and retrieval of Chinese ideographic characters which have been digitized into a machine-compatible format and stored in an accessible memory device. The storage location of each character is identified by a unique numerical code of base ten generated by the present encoding and retrieval method. Each of the nine basic strokes plus a zero stroke used to write all Chinese characters is assigned an arbitrary numerical equivalent; a unique numerical code for each character is generated by assembling the strokes in the same manner used to write the character and following the commonly-used rules establishing the sequence in which the strokes are written. The basic strokes representing the forms and the stroking sequence rules are combined to form a simulated guide character which serves as a mnemonic symbol to aid the encoding of the Chinese character and also serves to identify this scheme as a simulated character method of encoding ideographic character. Based on this simulated character method, an ideographic character machine can be designed; thus, typing in a set of numeric code of base ten can retrieve its correspondent ideographic character in print-out form.

1 Claim, 8 Drawing Figures

| NUMERIC CODE | 0 | 1 | 2 | 3 | 4 | 5 | 6 | 7 | 8 | 9 |
|---|---|---|---|---|---|---|---|---|---|---|
| STROKE 笔画名词 | | HORIZONTAL 横 | VERTICAL 竖(钩) | BENT 曲 | SLASH LEFT 撇 | ANGLE 角 | TWIST 弯 | HOOK 七(钩) | REPEAT 又(掫) | SLASH RIGHT 点(捺) |
| BASIC STROKE | 零 | 一 | 丨 | ⁀ | ノ | < | 3 | ㄴ | フ | 丶 |
| VARIATIONS OF STROKE | | | | | | | | | | |

FIG. 1.

| NUMERIC CODE | 0 | 1 | 2 | 3 | 4 | 5 | 6 | 7 | 8 | 9 |
|---|---|---|---|---|---|---|---|---|---|---|
| STROKE 笔画名词 | 宗合 | HORIZONTAL 横 | VERTICAL 竖(豎) | BENT 拐 | SLASH LEFT 扌撇 | ANGLE 角 | TWIST 弯 | HOOK 七(钩) | REPEAT 又(叠文) | SLASH RIGHT 七(捺) |
| BASIC STROKE | | 一 | 丨 | ㄱ | 丶 | ∨ | 3 | ㄴ | ㄱ | ╱ |
| VARIATIONS OF STROKE | | 丶丶 | ─ 丶 ノ ㄱ ノ | ㄱ ㄱ ㄱ ㄱ ㄅ ㄑ | 丶 丶 丶 | ∨ | ㄢ 3 3 ㄣ | ㄥ ㄥ ㄥ ㄥ ㄥ | ㄱ ㄱ | ╱ ⺀ 冫 |

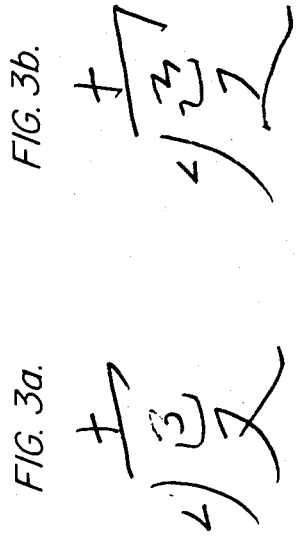

FIG. 3a.

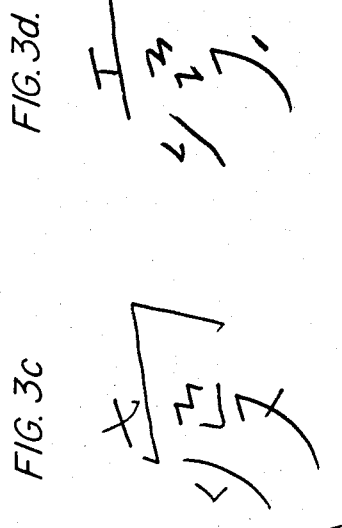

RULES FOR STROKING IN WRITING CHINESE IDEOGRAPHIC CHARACTERS

| RULE | EXAMPLE |
|---|---|
| 1. HORIZONTAL STROKE PRECEDES VERTICAL STROKE | 十　一+｜=十 |
| 2. SLASH LEFT BEFORE SLASH RIGHT | 人　ノ+乀=人 |
| 3. STROKE FROM TOP TO BOTTOM | 三　一+一+一=三 |
| 4. MIDDLE STROKE PRECEDES SIDE STROKES | 小　亅+丶+乀=小 |
| 5. STROKES PROCEED FROM OUTSIDE TO INSIDE | 月　ノ+]+一+一=月 |
| 6. ENCLOSING STROKES, INSIDE STROKES, THEN CLOSING STROKE | 国　｜+]+一+丶+一+｜+一+一=国 |
| 7. STROKE FROM LEFT TO RIGHT | 化　ノ+｜+ノ+乚=化 |

| CHINESE CHARACTER IN DISPLAY | BINARY ROW IN MEMORY | DECIMAL EQUIVALENT |
|---|---|---|
|  | 0 0 0 0 1 0 0 0 | 8 |
| | 0 0 0 0 1 0 0 0 | 8 |
| | 0 1 1 1 1 1 1 1 | 127 |
| | 0 1 0 0 1 0 0 1 | 73 |
| | 0 1 1 1 1 1 1 1 | 127 |
| | 0 0 0 0 1 0 0 0 | 8 |
| | 0 0 0 0 1 0 0 0 | 8 |
| | 0 0 0 0 1 0 0 0 | 8 |

METHOD FOR ENCODING IDEOGRAPHIC CHARACTERS

This is a continuation-in-part of application Ser. No. 428,692 filed Sept. 30, 1982, now abandoned.

BACKGROUND OF THE INVENTION

1. Field of the Invention

This invention relates generally to an encoding method and is more particularly directed to a method for encoding ideographic characters which permits machine retrieval from storage and reproduction of the characters.

2. Description of the Prior Art

The large number of characters involved in an ideogram-based language, such as Chinese, makes the reproduction and transmission of the language difficult. For example, to communicate in written Chinese with a moderate degree of proficiency, between three thousand and eight thousand different characters may be required, with each character or combination representing a word or expression. Consequently, prior art devices for typing or printing Chinese have been complex mechanisms requiring extensive training before a person could operate it with any degree of proficiency. A typewriter, patterned after the hand-setting of type in printing, may include several removeable compartmented trays or galleys containing the thousands of individual characters from which one character at a time is selected, struck against paper carried by the typewriter, and returned to its original storage position before the next character is selected, and the process repeated. Examples of such typewriters are disclosed in U.S. Pat. Nos. 1,245,633, issued to Sugimoto, and 4,064,983, issued to Inose et al. Another machine, as disclosed in U.S. Pat. Nos. 2,534,330 to Wong, has a keyboard with numerous keys, each of which controls two characters to provide a limited vocabulary of approximately two thousand characters. To efficiently operate these machines, a typist must be familiar with the language and must memorize the locations of the thousands of characters.

To simplify the typing or other reproduction of Chinese characters, methods have been developed to categorize all of the commonly-used characters according to strokes, groups of strokes or portions of characters which occur repetitively, and can thus be used as indices. By using such classification techniques, the large-number of characters can be categorized into smaller groups, thus permitting easier and faster location of the desired characters. Examples of devices which employ classification techniques are disclosed in U.S. Pat. Nos. 2,613,794 and 2,613,795, both issued to Yutang; 2,950,800, to Caldwell; 3,319,816, to Brown; and 3,325,786 to Shashoua et al. Again, the proficient use of these devices requires extensive training of an operator, who must be already familiar with the language, both in the operation of the machine and in the use of the specific technique employed to classify the characters in the vocabulary.

With the increasing availability of computers with large-capacity data storage capabilities, apparatuses have been developed which couple this storage capability with some classification technique to electronically store, retrieve and transmit and/or reproduce Chinese characters with greater ease than has been available. Examples of such apparatuses are disclosed in U.S. Pat. Nos. 3,820,644 issued Yeh; 4,096,934, issued to Kirmser et al.; 4,187,031 to Yeh; 4,144,405 to Wakamatsu; and 4,228,507, to Leban. In 3,820,644, each Chinese character is represented by a hexadecimal digital code and stored in a master file within a direct access storage apparatus. The characters are grouped according to the order of the Chinese phonetic alphabet, and a keyboard with numerous keys is used to select the desired character. The 8,000-plus characters of wide use are classified into groups according to the frequency of use, and each group is further divided into sections, with each section having fifteen characters of the same Standard Chinese Phonetic Syllable. The sections are arranged in alphabetical order according to the Chinese phonetic alphabet.

To retrieve or select the desired characters using the apparatus described in U.S. Pat. No. 3,820,644, several key strokes are required to select the appropriate group and section and then the correct character in the section. Reference charts of the appropriate classification groups and sections are used to assist the operator. The hexadecimal code of the retrieved character may be transmitted to another system, or may be converted to a binary code and displayed or printed on the appropriate equipment.

The method used in U.S. Pat. No. 4,096,934 for encoding and retrieving characters involves the use of phonetic symbol in accordance with a complex set of rules that relate to the category into which the character is grouped and the physical shape of the characters. Since phonetic symbols based upon the Mandarin dialect are used, problems arise when another dialect is involved.

In U.S. Pat. No. 4,187,031 a keyboard has keys which correspond to elements of the Korean alphabet and to a set of physical forms into which the characters are grouped, with each key stroke having a unique binary code. The alphabet elements and character forms are stored in hexadecimal form, and a computer links the keyboard and a storage device. To retrieve a character, the form of the character is first provided and then the alphabet elements are provided in proper sequence, with the computer being programmed to size and position the alphabet elements according to the word form.

In U.S. Pat. No. 4,228,507, a combination of letters are assigned to a grouping of arbitrarily-selected strokes used in writing Chinese characters, and numbers are used to designate the gross form of the character. The letters and numbers are assembled into a input code for a computer programmed to operate a plotter to reproduce the character.

From the foregoing, it is apparent that in attempting to provide techniques for computer-assisted reproduction or transmission of Chinese characters which are based upon the characteristic strokes used in writing Chinese, the prior art solutions have introduced complexities of their own, and generally required that the user at least having a working knowledge of the written language.

SUMMARY OF THE INVENTION

Accordingly, it is an object of the present invention to provide a method for encoding ideographic characters to permit the machine retrieval and reproduction of the characters.

Another object of the present invention is to provide a method for producing a numerical code for an ideographic character which will permit the machine retrieval, display, reproduction or transmission of the character.

Another object of the invention is to provide a method of the foregoing type which utilizes a small number of basic strokes used in the writing of ideogaphic characters, and following the established rules which determine the sequence in which the strokes are written.

A further object of the invention is to provide a method of the foregoing type in which a character formed from an arrangement of the basic strokes serves as a prompt or a guide character in the encoding process.

Yet another object of the present invention is to provide a method of the foregoing type which does not require extensive memorization or a high level of knowledge of the ideographic language, and therefore is easy to learn and use.

Still another object of the present invention is to provide an apparatus such as an ideographic character machine to receive a set of numeric code of base ten typed in by a typist to print out the correspondent ideographic character.

These and other objects are achieved in the present invention by a method which provides for the numeric encoding of an ideographic character to permit the machine retrieval of the character from a storage device. The method reduces all of the strokes used in writing all of the ideographic characters, such as Chinese ideographic characters, to nine basic strokes which are assigned arbitrary numerical equivalents from 1 to 9, with the basic strokes assembled into a guide or prompt character which serves to guide the user in producing the numerical code for the desired character by following only the basic, established rules governing the sequence in which the strokes are written. The numerical code is used by a processor as a unique identifier or address to retrieve the corresponding character from a storage device in which the character may be stored, for example, in a binary or decimal numerical code form. The retrieved character can be displayed, reproduced in printed form, or be transmitted over a telecommunication system.

An apparatus for implementing the method may consist of a numeric keyboard or key pad, a memory or storage device for storing the ideographic characters in a machine-compatible format according to the numerical address or location, and a processing device which retrieves the desired character from memory according to the input numeric code and provides a suitable output, such as a visual display, a printer or a photo-composition machine, or provides a machine-compatible equivalent of the character for remote transmission.

BRIEF DESCRIPTION OF THE DRAWINGS

The above description, as well as further objects, features and advantages of the present invention, will be more fully appreciated by reference to the following description of presently-preferred but nonetheless illustrative embodiments in accordance with the invention, and the accompanying drawings wherein:

FIG. 1 is a chart illustrating the basic writing strokes used in the method of the present invention and their corresponding numeric code;

FIG. 2 is a chart illustrating the basic rules governing the sequence in which the strokes are written, with illustrative characters;

FIGS. 3a–3d show different of the prompt or guide character assembled from the basic strokes shown in FIG. 1;

DESCRIPTION OF THE PREFERRED EMBODIMENT

Figure 4:
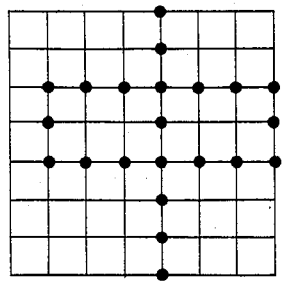
FIG. 4 is a chart illustrating an example of a machine-compatible digital format for storage and display of ideographic characters.

The thousand of Chinese ideographic characters can be written with a small number of basic or universal strokes and following the rules governing the order or sequence in which the strokes are made. These strokes and rules are customarily taught to students learning Chinese. For the purposes of this invention the number of basic strokes has been reduced to nine, and each has been assigned an arbitrary, single-digit numeric code which will permit the simple encoding of any desired Chinese character and its retrieval from a memory or storage device.

Shown in FIG. 1 of the drawings are the nine basic strokes which are used in combination to write any desired Chinese character, and the assigned corresponding single-digit numeric code from 1–9. The use of nine basic strokes with corresponding 1–9 numeric codes permits the implementation of the method of the present invention by using a standard, readily-available numeric key pad or touch pad which is customarily incoroporated into conventional control panels, such as typewriters or computer keyboards. Also shown in FIG. 1 are some common variations of the basic strokes which exhibit visual differences.

The basic rules which establish the order or sequence in which the strokes are made in writing a Chinese character are shown in FIG. 2. There are seven basic rules which are taught to all students learning to write Chinese characters, and these will be considered briefly. In a character having intersecting horizontal and vertical storkes, such as the character for the number "10", 十, the horizontal stroke is made first, and then the vertical stroke is made to intersect the horizontal stroke. For a character like "人" meaning "people" or "person" which consists of two, oppositely-directed slanting lines which touch, the stroke which slants to the left is made before the stroke which slants to the right.

For a character that consists of a plurality of horizontal strokes, the order of the strokes proceed from top to bottom, such as in the character "三" which means the numeral "3". The top horizontal stroke is made first, then the middle stroke, and finally the lower stroke. For a character which has a center stroke with side strokes, such as the character "小" which means "small", the central, vertical stroke is written first, and then applying the earlier rules the left slash is written before the right slash, as is shown in FIG. 2.

With continued reference to FIG. 2, in writing a character that is composed of groups of strokes which can be divided as a left group and a right group, the strokes are made from left to right, and the formation of each group of strokes is in accordance with the other rules establishing the order of strokes. Thus, the character "你" which means "you", would be written as shown in FIG. 2. In writing a character which is enclosed on three sides, with the bottom left open, the enclosing strokes are made first, and then the strokes which are enclosed are written, such as is illustrated in the character "月" which means "moon" or "month". An extension of this stroking sequence is illustrated by a character which is completely closed, such as "国" meaning "country", wherein the strokes forming the enclosure on the left, top and right sides are made in this order first, then the strokes which are enclosed are made, and finally the sealing or enclosing stroke is made.

Thus, it can be seen that in general the stroking sequence proceeds from left to right, and from top to bottom, and when the character includes groups of strokes or radicals which are enclosed, the enclosing strokes are made before those which are enclosed.

The nine basic strokes shown in FIG. 1 which are used in the writing of any desired Chinese character can be assembled, by applying the basic rules for stroking illustrated in FIG. 2, into a simulated character which has no logical meaning in Chinese, but which may be used as an aid or prompt in guiding a person to encode Chinese characters using the method of this invention. One embodiment of this simulated or guide character is shown in FIG. 3a, and as can be seen, consists of the nine basic strokes assembled in the sequence corresponding to their numeric codes and in accordance with the rules for writing the strokes.

Looking more closely at FIG. 3a, it can be seen that the entire guide character is composed of the nine basic strokes shown in FIG. 1, with the strokes being made or written in the order of the numeric code, that is, with the horizontal stroke (numeric code "1") being written first, then the vertical stroke (numeric code "2"), then the bent stroke (numeric code "3"), and so forth. The basic strokes, in sequence according to their numeric code, are assembled in accordance with the rules for stroking shown in FIG. 2, such as the horizontal stroke being made before the vertical stroke, the strokes proceeding from top to bottom of the character, and from left to right, etc.

Prior to outputting an ideographic character, the encoding process must be initiated according to an encoding method identified in this invention as the simulated character method of encoding ideographic characters. Based on this method, an ideographic character code can be inputted into an ideographic character system through the numeric key pad of base ten for obtaining a type-out of the correspondent ideographic character on hard copy printer or video display unit. During the encoding processing, if the typist forgets the code for a particular stroke within a character, he can easily use the simulated character to guide him to regain that specific stroke code. For example, if the typist starts to encode the character "中", he knows the first vertical stroke as "2" but forgets the second "⇁" stroke code. At this point the typist refers to the simulated character "中" to regain the character code for "⇁" as "3" and continues to finish the encoding process with "1" and "2", making the entire character code as "2312".

FIGS. 3b–3d illustrate variations of the guide character which result from slight modifications of the visual appearance of the basic strokes. For example, in the embodiment of FIG. 3b, the strokes corresponding to numeric code numbers "3" and "6"–"9" have different physical appearances. Some of the variations in the appearance of the basic strokes are shown in FIG. 1. The numeric code corresponding to the respective basic stroke remains unchanged, however, and the basic rules of stroking sequence are still followed.

By remembering the numeric code corresponding to the nine basic strokes, and following the basic rules establishing the order of stroking, a person who has been trained for only a short period of time and who does not necessarily have an extensive, formal training in the written Chinese language, can code any desired Chinese character by referring to the guide character of FIG. 3a. To illustrate the use of the guide character for encoding, the character "中" meaning "middle" can be encoded in the following manner. The character is composed of two groups of strokes or radicals: a box or enclosing radical "口" and a vertical line. Therefore, the character "中" is encoded with the following strokes and numerical equivalents:

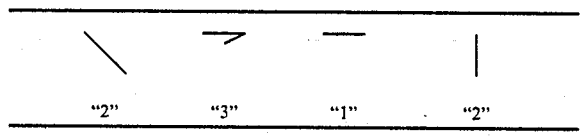

| \ | ⇁ | — | \| |
|---|---|---|---|
| "2" | "3" | "1" | "2" |

The numerical code "2312" is then the unique equivalent of "中" and can be used as the input code or address with the appropriate device to retrieve the character from a memory or storage device, which can be output in the desired form, or the code can be transmitted in a telecommunication system to a corresponding retrieval device to retrieve the character from memory and output it in the desired form at a remote location.

There are instances in which the encoding of characters involves groups of strokes, or radicals, which visually are different, but which result in the same numerical code. As examples "土", "士", and "工" may all be represented by "121". To avoid confusion in such situations, specific strokes may be arbitrarily defined such that a unique numerical sequence results. Thus, "土" may be encoded as "121" while "士" may be encoded by "721" in which the first horizontal stroke in the radical is encoded as a "7" instead of the regular "1" and the encoded radical would be represented graphically as "士". Similarly, the radical "工" may be encoded as "127" and be represented graphically as "工".

In both of the latter instances, the "hook" portion of the "7" stroke is not too obvious so that the visual representation is still acceptable.

Another example in which possible confusion is avoided by predefined encoding sequence is the character "—" meaning the Chinese numeral "one" which, according to the method described herein, would be encoded by the digit "1". The Chinese numeral "one", and the limited number of other single stroke characters, may be uniquely encoded by using the digit "0", which does not represent a writing stroke. Thus, for example, the numeral "—" may be encoded as "101".

The digit "0" may be used in a similar manner as a unique identifier in the encoding process to denote special characters or operations, such as punctuations.

For convenience these special uses of the numeric codes and the arbitrarily defined encoding sequences noted above may be catalogued for reference by the encoder. These special uses and the arbitrarily defined encoding sequences, which may be considered as "exceptions" to the rules of the present method, are limited in number and do not present a burden to its use.

In general, if a large number of stroke types are used for coding characters, it becomes more complex to distinguish the stroke forms and more complex to implement into a system along with the ambiguity problem. On the other hand if the number of strokes are small, the number of ambiguity codes rise. This ambiguity problem causes coding error, requires highly trained operators, and reduces the efficient indexing ability for vocabulary listing. It is also more expensive to implement a hardware system with a large number of stroke types. In a small number of stroke types system, more non-unique character codes will become prevailing, making system operation more troublesome.

By use of nine strokes plus a zero stroke key in the present invention, a system design can be achieved for its uniqueness of character codes, easiness of hardware implementation, faster operation for the typist, less memorization, and less encoding confusion. It is therefore an improvement over previous complex coding scheme with a twenty-one stroke type system and improvement over ambiguity problem for less than a seven-stroke type system as seen in past inventions.

With reference to Table 1, there contains a small set of characters excerpted from the eight thousand unique character codes for the present invention study. This table illustrates the effect of the simulated character code for obtaining a print-out character either in simulated form, in simplified form as used in China, or in complex form dependent upon the content of the character data base style in memory.

Table 1. List of Character Subset

| Unique simulated character code in sorted form | Simulated character form | Simplified character form | Complex character form |
|---|---|---|---|
| 1 | / * | / * | / * |
| 101 | 一 | 一 | 一 |
| 1112 | 丰 | 丰 | 豐 |
| 12 | 十 | 十 | 十 |
| 121 | 土 | 土 | 土 |
| 127 | 工 | 工 | 工 |
| 12743 | 工力 | 工力 | 工力 |
| 204 | ,(comma) | ,(comma) | ,(comma) |
| 23112191 | 国 | 国 | 國 |
| 2312 | 中 | 中 | 中 |
| 249 | 小 | 小 | 小 |
| 331 | 马 | 马 | 馬 |
| 4211 | 仁 | 仁 | 仁 |
| 4243249 | 你 | 你 | 你 |
| 4311 | 月 | 月 | 月 |
| 43931 | 鸟 | 鸟 | 鳥 |
| 492 | 个 | 个 | 個 |
| 541 | 女 | 女 | 女 |
| 6 | 6 * | 6 * | 6 * |
| 606 | 了 | 了 | 了 |
| 622311 | 阝日 | 阝日 | 陽 |
| 7 | 7 * | 7 * | 7 * |
| 707 | 乙 | 乙 | 乙 |
| 721 | 士 | 士 | 士 |
| 89 | 又 | 又 | 又 |
| 941112 | 羊 | 羊 | 羊 |

\* Arabic numerals

As unique simulated character codes in this table are sorted in numerical order, they will facilitate look up as an abridged version of the typist spelling dictonary.

In the present invention, all of the characters comprising a vocabulary will be encoded in the manner described above, and stored in a memory or storage device in a machine-compatible format which will permit retrieval, display, reproduction, transmission or other processing of the information. The specific location in storage, or address, of the character is uniquely identified by the numerical code produced in the encoding technique described above. Thus, in retrieving the desired character from storage, the numerical code is used by the processor as the address by which the characters in memory are scanned, and the correct character retrieved.

To reduce the scan time during which the processor is locating the desired character, the characters can be categorized within the memory by any known technique, such as by the number of digits in the numerical code, and further categorized by the order of the digits in the numerical code.

Each of the Chinese characters in the vocabulary can be converted to a machine-compatible format by any known means. For example, each character may be digitally converted by the use of a matrix having sufficient points to provide the necessary optical resolution, and the digitized character converted to a binary code or hexadecimal code for machine manipulation. FIG. 4 illustrates the digital conversion of the character "中" using an 8×8 dot matrix. The corresponding binary code and the decimal code for each row are also shown in FIG. 4, either of which may be the format in which the digitized character is stored in a memory device. Thus, for example, for each numeric code the corresponding binary code for the character will be retrieved from memory storage, and this information can be displayed on a video output such as a CRT, or can be printed via a dot matrix printer.

For greater resolution a matrix having a more dots can be used, which will require greater storage capability. The result, however, is a greater enhancement of the visual output of the ideographic character and a closer correspondence between the appearance of the digitized form of the character and the brush stroke-written form. In the example of FIG. 4, an 8-bit word length digital system has been illustrated. For a correspondingly higher resolution, a 24-bit word length can be used.

Figure 5:
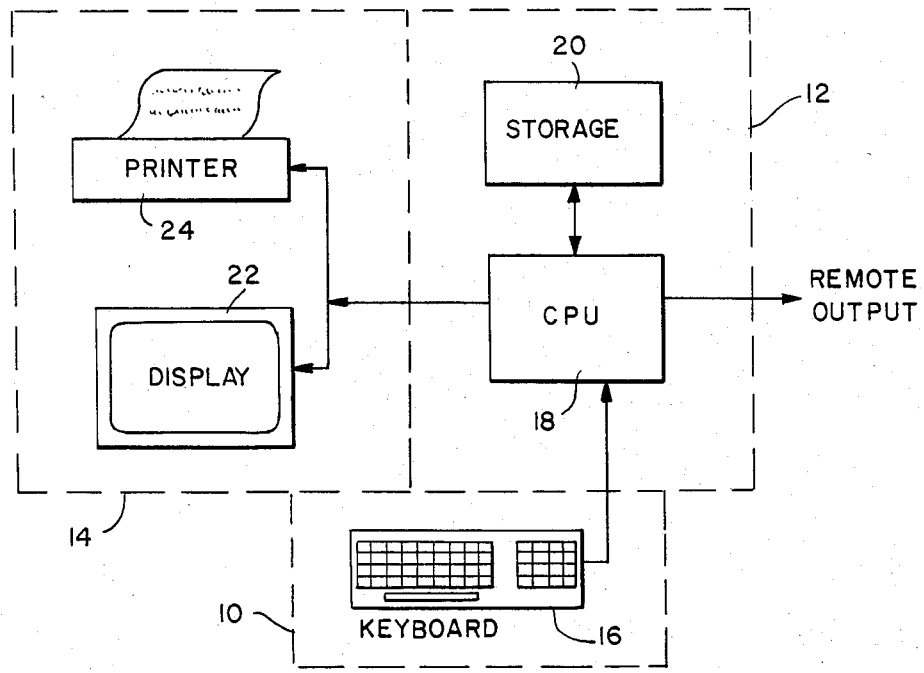
FIG. 5 is a schematic of an apparatus for the implementation of the present invention.

An illustrative example of an apparatus for implementing the method of the present invention is shown in FIG. 5 which includes an input unit 10, a processing/storage unit 12 and an output unit 14. The input unit 10 can conveniently be embodied as a conventional keyboard 16. The keyboard 16 is coupled to a processor 18 in the processing/storage unit 12, in which the unique numerical code is used to retrieve the corresponding ideographic character from a storage means 20, and further processed for output, either via a video display 22, such as a cathode ray tube (CRT), for displaying the desired character, or via a printer 24. As each character is encoded and appropriately indicated as such to the processor, such as by hitting the return key or the space bar on the conventional keyboard, the character retrieved from the storage can be displayed on the display 22 and be printed simultaneously on the printer 24, character by character. When an entire line of characters is desired, the display and/or print out of the line of characters may occur at the end of the line, rather than character by character. The displaying of characters permits verification of the character retrieved, and correction if an error has occurred.

It can be readily seen that the character corresponding to the unique numerical code retrieved by the processor 16 from the storage 20 means and processed for output, can be transmitted to a remote location and be displaed on a suitable video display unit or printed on any suitable printer. This remote output capability is possible without the need for an additional processor and storage at the remote location, provided that an output device is available which is compatible with the format of the character retrieved from storage. However, for telecommunication purposes in which the Chinese characters are to be transmitted over substantial distances, a corresponding processor and storage components would be provided at the remote output location. For telecommunication purposes it is envisioned that the numeric code input from the keyboard 16 would be entered into the processor 18 at the local station, and be transmitted to a corresponding processor at a remote location which would then retrieve the corresponding character from a memory at the remote location and provide the output either to a video display or to a printer. All of the components described with regard to FIG. 5 are readily available, and can be assembled quickly and at reasonable cost.

If the display unit, such as 22 in FIG. 5, is a graphic CRT display used as the output "soft" copy device, then the hard copy or the printed copy can be obtained by commanding the processor to dump the screen code into the graphics printer. In this fashion, each of the encoded characters retrieved from storage can be viewed on the CRT prior to being printed, and corrected in the event that the wrong character has been encoded.

Thus the present invention provides a method for reproducing ideographic characters, such as Chinese characters, by using a simple method which generates a unique numerical code for each character, which code can be used by an electronic digital processor to retrieve the corresponding character stored in a storage unit in machine-compatible form suitable for output. All of the characters in the vocabulary are stored in the memory device in a digitized form, and the numerical code is utilized by the processor as an address identifier to retrieve the digitized character. The size of the vocabulary which may be stored is dependent upon the capability of the system; the larger the storage capability, the larger the vocabulary which can be provided.

The unique feature of the present invention is the very simple method of providing a totally numerical code for any desired ideographic character using only the numerals 1-9 which correspond to nine basic strokes used in writing the characters, and following a few basic rules which establish the sequence in which the strokes are made during the writing of such characters. Other than learning the arbitrary nine basic strokes and their corresponding numerical equivalents, and a rudimentary knowledge of the stroking sequence principles, the method of the present invention does not require a high level of education in the written language for its use.

Other than a readily apparent use in reproducing ideographic characters, such as in a conventional typewriter, the present method can be utilized in any situation in which it is desired to communicate and/or reproduce ideographic characters. Thus, the method can be readily employed in the photo composition of the ideographic language for printing and publication; for telecommunication in the ideographic language, such as via teletypewriter, telex, telegraph, etc.; and for indexing and sorting ideographic characters for use in dictionaries, directories, or other similar listings.

While Chinese has been used in the description, the present invention is equally applicable to other ideogram-based languages. Numerous modifications and variations of the present invention are possible in light of the above disclosure. it is therefore to be understood that within the scope of the appended claims the invention may be practiced otherwise than as specifically described herein.

I claim:

1. A method for encoding an ideographic character by transcribing the character into a unique numerical code for machine storage, retrieval and reproduction of the character by a digital data handling means, comprising:

(a) digitizing the character into a uniquely programmed numerical code compatible with said digital data handling means; and (b) providing a location in a storage means in said digital data handling means, and identifying the location with said uniquely programmed numerical code generated by:

utilizing a group of ten basic, universal forming strokes which can be combined in the writing of any of said characters, each of the strokes having a unique, single digit numerical equivalent code;

duplicating the character by assembling the strokes necessary to form the character in the same manner and sequence as the character is written manually, following known, established rules governing the sequence in which the strokes are made in writing the character; and providing a reference character to serve as a guide in the assembly of the strokes, said reference character being a simulated ideographic-type character resulting from assembling all the strokes in said group in sequence according to the numerical order of the single-digit numerical code of the strokes and in accordance with the rules governing the sequence in which the strokes are made in writing the character; and (c) retrieving the digitized character from the storage means by generating the corresponding location numerical code by repeating the sequence of step (b).

* * * * *